United States Patent
Low et al.

(10) Patent No.: US 9,449,429 B1
(45) Date of Patent: Sep. 20, 2016

(54) STEREOSCOPIC MODELING BASED ON MAXIMUM OCULAR DIVERGENCE OF A VIEWER

(71) Applicant: DreamWorks Animation LLC, Glendale, CA (US)

(72) Inventors: Matthew Low, Santa Monica, CA (US); Donald Greenberg, Ithaca, NY (US); Philip McNally, Eagle Rock, CA (US)

(73) Assignee: DreamWorks Animation LLC, Glendale, CA (US)

( * ) Notice: Subject to any disclaimer, the term of this patent is extended or adjusted under 35 U.S.C. 154(b) by 486 days.

(21) Appl. No.: 13/831,476

(22) Filed: Mar. 14, 2013

Related U.S. Application Data

(63) Continuation of application No. 13/563,652, filed on Jul. 31, 2012, now abandoned.

(51) Int. Cl.
    *G06T 17/00*      (2006.01)

(52) U.S. Cl.
    CPC ..................................... *G06T 17/00* (2013.01)

(58) Field of Classification Search
CPC ....... G06T 3/00; G06T 7/002; G06T 7/0022; G06T 7/0075; G06T 7/0077; G06T 13/20; G06T 15/00; G06T 15/10; H04N 13/00; H04N 13/0003; H04N 13/0007; H04N 13/0011; H04N 13/0018; H04N 13/0055; H04N 13/0203; H04N 13/0239; H04N 13/0246; H04N 13/0282; H04N 13/0472; H04N 19/154; H04N 2013/0074; H04N 2013/0081; G02B 7/12; G02B 23/18; G02B 27/22; G02B 27/2228

USPC ........................................................ 345/420
See application file for complete search history.

(56) References Cited

U.S. PATENT DOCUMENTS

| | | | |
|---|---|---|---|
| 8,284,235 B2 * | 10/2012 | Held et al. ...................... 348/42 |
| 2001/0033327 A1 * | 10/2001 | Uomori et al. .................. 348/47 |
| 2005/0089212 A1 * | 4/2005 | Mashitani et al. ............ 382/154 |
| 2007/0248260 A1 * | 10/2007 | Pockett ......................... 382/154 |
| 2009/0096863 A1 * | 4/2009 | Kim et al. ...................... 348/42 |
| 2010/0238272 A1 * | 9/2010 | Cameron et al. ............... 348/47 |
| 2010/0245369 A1 * | 9/2010 | Yoshino ........................ 345/522 |
| 2011/0032252 A1 * | 2/2011 | Ohta ............................. 345/419 |
| 2011/0304618 A1 * | 12/2011 | Chen et al. .................... 345/420 |
| 2012/0026158 A1 * | 2/2012 | Oto ............................... 345/419 |
| 2012/0242655 A1 * | 9/2012 | Ogata et al. .................. 345/419 |
| 2012/0249532 A1 * | 10/2012 | Kawada ........................ 345/419 |

* cited by examiner

*Primary Examiner* — Ulka Chauhan
*Assistant Examiner* — Sae Won Yoon
(74) *Attorney, Agent, or Firm* — Morrison & Foerster LLP

(57) ABSTRACT

A computer-implemented method for computing an effective inter-ocular distance for a modeled viewer based on a maximum ocular divergence angle. A maximum ocular divergence angle, viewing distance, and an inter-ocular distance are obtained for the modeled viewer. An effective inter-ocular distance is computed based on the viewing distance, the inter-ocular distance, and the maximum ocular divergence angle. The effective inter-ocular distance represents the maximum positive parallax for the modeled viewer having the defined maximum ocular divergence angle. The effective inter-ocular distance may be used in a stereoscopic modeling system in place of the inter-ocular distance, the stereoscopic modeling system relating a set of parameters in a camera space to a set of parameters in viewer space. The stereoscopic modeling system may be a stereoscopic transformation.

32 Claims, 9 Drawing Sheets

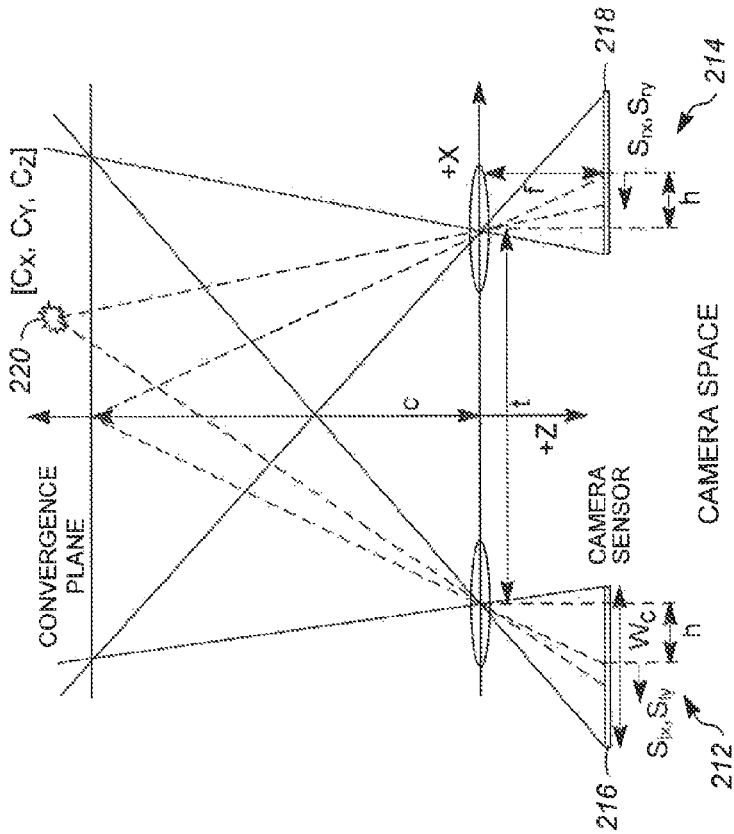
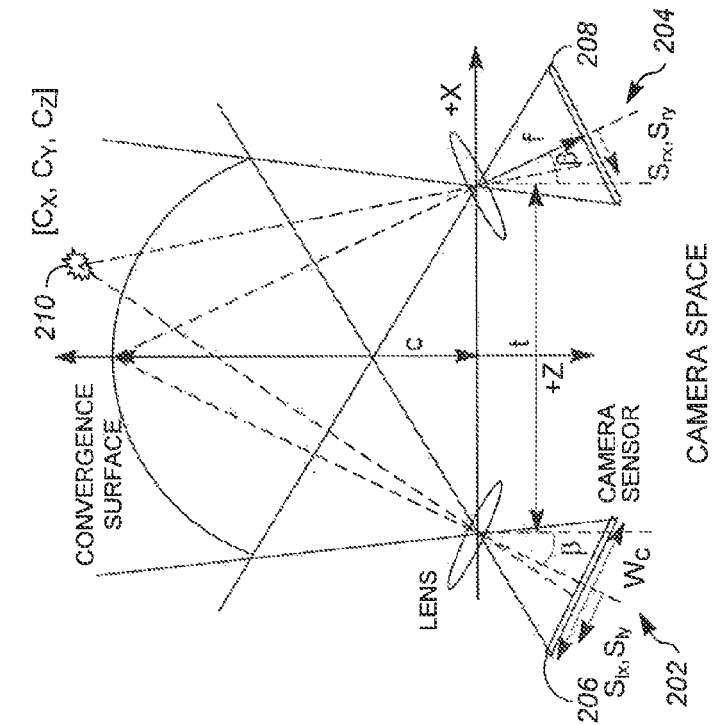
FIG. 2A
FIG. 2B

STEREOSCOPIC MODELING BASED ON MAXIMUM OCULAR DIVERGENCE OF A VIEWER

BACKGROUND

1. Field

The present disclosure relates generally to creating a stereoscopic modeling system based on perceptual constraints of a modeled viewer, and more specifically to creating a stereoscopic modeling system based on a maximum divergence angle for a modeled viewer.

2. Related Art

Cinematographic-quality computer animation has evolved to produce increasingly realistic and engaging visual effects. One way that this is accomplished is through the use of stereoscopic filming techniques that simulate human binocular vision by presenting slightly different viewpoints of a scene to a viewer's left and right eye. This technique, also known colloquially as "3D," can be used to enhance the illusion of depth perception and make objects in a computer-generated scene appear to extend outward from a two-dimensional screen.

In normal human binocular vision, each eye views the world from a slightly different perspective. The difference in the view from each eye, also called parallax, is caused, in part, by the spatial separation between the eyes. The brain is able to combine the different views from each eye and use the parallax between views to perceive the relative depth of real-world objects.

Computer animation stereoscopic filming techniques take advantage of the brain's ability to judge depth through parallax by presenting separate images to each eye. Each image depicts a computer-generated object from a slightly different viewpoint. The distance between the left and right images displayed on a screen (parallax) indicates the relative depth of the displayed computer-generated object. Parallax can be positive or negative depending on whether the computer-generated object appears to be behind the screen (positive parallax) or if it appears to be in front of the screen (negative parallax).

To predict how the computer-generated object will be perceived by a viewer, a stereoscopic modeling system may be constructed that accounts for the position of the computer-generated object within the scene, the stereoscopic filming parameters, and the position of a modeled viewer with respect to a modeled display screen. For example, one type of stereoscopic modeling system may include a stereoscopic transformation that produces a stereoscopically transformed geometry based on the geometry of the computer-generated object. The resulting stereoscopically transformed geometry can be used to assess the quality of a computer-generated scene and provide feedback for the scene director or film maker.

To increase the stereoscopic effect, in some cases, it may be desirable to increase the positive parallax or the distance between the left and right images that are presented to the viewer. In some cases, a high degree of positive parallax requires that the viewer slightly diverge their vision to track both left and right images. However, one drawback to existing modeling systems is that typical systems cannot account for the outward divergence of human eyes. That is, typical stereoscopic modeling systems (e.g., stereoscopic transformations) assume that the human eye is not capable of outward divergence.

The systems and methods described herein provide techniques for dealing with outward divergence of a viewer's eyes in order to model realistic viewing scenarios.

BRIEF SUMMARY

In one exemplary embodiment an effective inter-ocular distance is computed for a modeled viewer based on a maximum ocular divergence angle. A maximum ocular divergence angle, viewing distance, and an inter-ocular distance are obtained for the modeled viewer. An effective inter-ocular distance is computed based on the viewing distance, the inter-ocular distance, and the maximum ocular divergence angle. The effective inter-ocular distance represents a maximum positive parallax condition for the modeled viewer.

In some embodiments, the effective inter-ocular distance is computed by adding the inter-ocular distance to twice the viewing distance times the tangent of the maximum outward ocular divergence angle.

In some embodiments, a computer-generated scene having a computer-generated object in view of a pair of stereoscopic cameras is composed based on the effective inter-ocular distance. A stereoscopic image of the computer-generated object within the computer-generated scene is created, the image having a positive parallax between left and right views of the computer-generated object that is greater than the inter-ocular distance of the modeled viewer.

In some embodiments, the effective inter-ocular distance may be used in a stereoscopic modeling system in place of the inter-ocular distance, the stereoscopic modeling system relating a set of parameters in a camera space to a set of parameters in viewer space. The stereoscopic modeling system may be a stereoscopic transformation and the effective inter-ocular distance is used to compute one or more stereoscopically transformed vertices.

DESCRIPTION OF THE FIGURES

FIGS. 2A and 2B depict exemplary configurations for stereoscopically filming a computer-generated scene.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Figure 1:
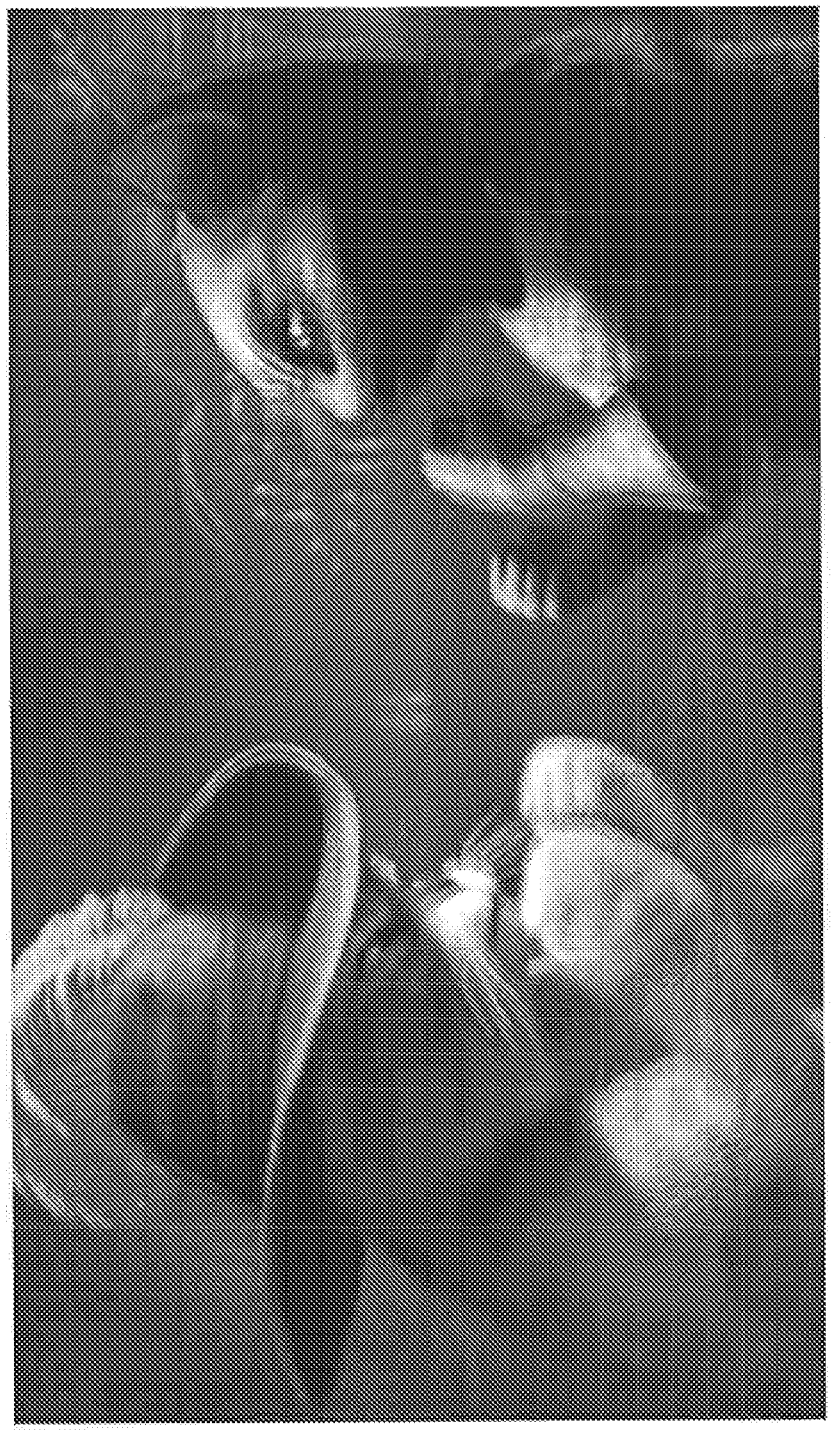
FIG. 1 depicts a stereoscopically filmed, computer-generated scene.

FIG. 1 depicts a stereoscopically filmed, computer-generated scene. The scene depicts two animated characters viewed in profile from the side. For purposes of this discussion, each animated character is treated as a single computer-generated object. The image depicted in FIG. 1 is a composite of two views of the computer-generated scene: one view from a left camera and one view from a right camera. The left and right camera views can be used to produce a stereoscopic image of the computer-generated scene. Typically, the cameras used to produce the left and right views are offset a distance that corresponds to an estimated distance between the viewer's eyes (approximately 65 mm).

The image in FIG. 1 appears slightly blurred because the animated characters (exemplary computer-generated objects) are viewed from the slightly different positions of the left and right camera. However, when the image is viewed with appropriate stereoscopic equipment, the left-camera view is presented to the viewer's left eye in isolation and the right-camera view is presented to the viewer's right eye in isolation. This can be achieved using a number of techniques that are known in the art including, for example, use of stereoscopic glasses. Using these known techniques, the left-camera view is separately presented to the left eye using polarized or color-coded light that corresponds to a polarized or color-coded left lens of the stereoscopic glasses. Similarly, the right-camera view is separately presented to the right eye using polarized or color-coded light that is distinguishable from the left-camera view.

The viewer is able to mentally and visually combine the left-camera and right-camera view into a composite image that includes a certain degree of parallax for one or more computer-generated objects. The greater the parallax, the closer/farther the computer-generated object appears to the viewer (with respect to the display screen). As discussed above, a filmmaker can use this stereoscopic effect to make computer-generated objects appear to have depth even though they are displayed on what is essentially a two-dimensional display screen.

1. Filming and Viewing a Stereoscopic Computer-Generated Scene

FIGS. 2A and 2B depict exemplary optical configurations of a stereoscopically filmed computer-generated scene in camera space. The configurations include a left camera (202, 212) and a right camera (204, 214) that are capable of viewing a point (210, 220) on an object in a computer-generated scene. FIGS. 2A and 2B depict alternative configurations for positioning the cameras when filming the computer-generated scene. FIG. 2A depicts a converged camera configuration with the cameras 202 and 204 pointed inward at an angle fi and converging along a curved convergence surface. FIG. 2B depicts an alternative configuration with cameras 212 and 214 pointed in a parallel direction and having sensors (216, 218) offset from the center of their respective lens at a distance h. In FIG. 2B, the parallel cameras 212 and 214 converge along a convergence plane. Either of the camera configurations shown in FIG. 2A or 2B can be used to stereoscopically film a computer-generated scene.

With reference to FIG. 2A, the left and right cameras (202, 204) each record a different image of the computer generated scene, which includes point 210. The left camera 202 records an image of the point 210 at left-image location ($S_{lx}$, $S_{ly}$) using the left camera sensor 206. Similarly, the right camera 202 records an image of the point 210 at right-image location ($S_{rx}$, $S_{ry}$) using the right camera sensor 208. The difference between the left-image location ($S_{lx}$, $S_{ly}$) and the right-image location ($S_{rx}$, $S_{ry}$) indicates the amount of parallax for point 210. Similarly, with reference to FIG. 2B, the left and right cameras (212, 214) each record a different image of the point 220 at left-image location ($S_{lx}$, $S_{ly}$) for left sensor 216 and the right-image location ($S_{rx}$, $S_{ry}$) for right sensor 218.

FIGS. 2A and 2B also depict several scene parameters that have an impact on how computer-generated objects or points in the computer-generated scene will be perceived by the viewer. The three-dimensional scene coordinate ($C_x$, $C_y$, $C_z$) describes the location of the point 210 within the computer-generated scene. Convergence distance c is the distance from the lenses and the convergence surface or convergence plane. The convergence surface/plane corresponds to the location of points that will have zero parallax between the left and right images. Also, points located further away from the convergence surface/plane will have greater parallax than those points that are closer to the convergence surface/plane. The camera separation t represents the distance between optical nodes of the left and right cameras and may also have an impact on the amount of parallax. The left and right cameras also have sensor width $W_c$ and a focal length f from the sensor to the lens.

Figure 2C:
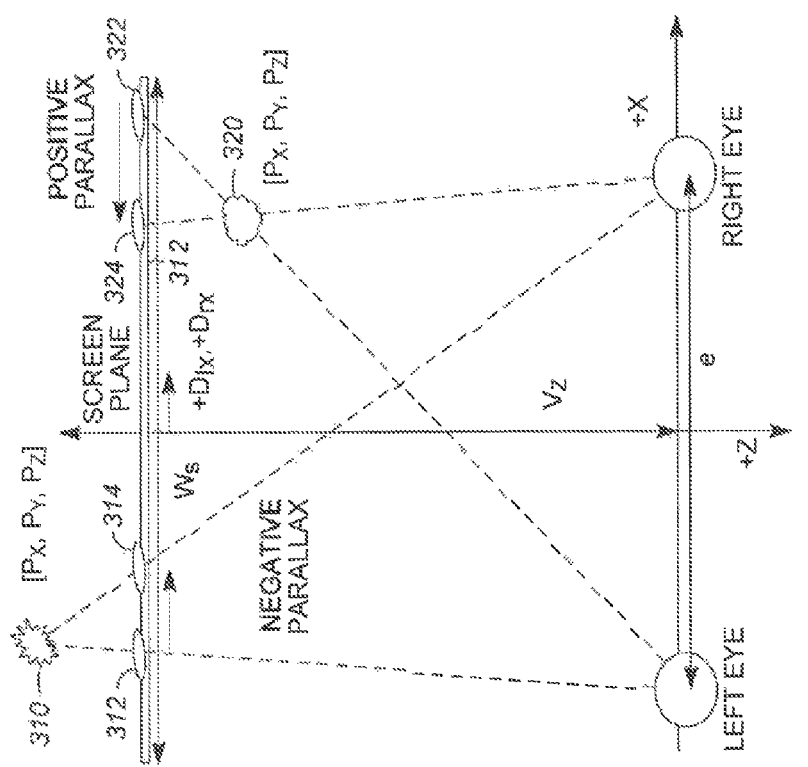
FIG. 2C depicts an exemplary configuration for displaying a stereoscopically filmed scene.

FIG. 2C depicts an exemplary configuration of a stereoscopically filmed computer-generated scene in viewer space. In general, viewer space represents how a stereoscopically filmed, computer-generated scene may be perceived by a modeled viewer located a specified distance from a modeled screen. As shown in FIG. 2C, the modeled viewer has an inter-ocular distance e and is positioned a distance $V_z$ from the modeled screen having a screen width $W_s$. FIG. 2C depicts how left and right views, each presented to the modeled viewer's left and right eye respectively, result in eye convergence that simulate the points as being out of plane from the screen. Specifically, FIG. 2C depicts perceived point 310 that appears to be behind the screen plane and perceived point 320 that appears to be in front of the screen plane.

Perceived point 310 is represented by left-camera image 312 and right-camera image 314. Because the left-camera image 312 is to the left of right-camera image 314, the perceived point 310 is said to have positive parallax and will appear to the viewer to have a depth that is greater than the distance from the viewer to the screen $V_z$. In other words, to the viewer, the perceived point 310 will appear to exist behind the screen plane.

Similarly, perceived point 320 is represented by left-camera image 322 and right-camera image 324. Because the left-camera image 322 is to the right of right-camera image 324, the perceived point 320 is said to have negative parallax and will appear to the viewer to have a depth that is less than the distance from the viewer to the screen $V_z$. In other words, to the viewer, the perceived point 320 will appear to exist in front of the screen plane.

In some situations, it may be desirable to increase the amount of positive parallax beyond the inter-ocular distance in order to increase the perceived depth or 3-D effect in a particular scene. Using some traditional modeling systems, the maximum positive parallax cannot exceed the inter-ocular distance. Specifically, positive parallax that exceeds the inter-ocular distance results in an outward ocular divergence of a modeled viewer, which is not possible using some traditional modeling systems. As a result, for these types of modeling systems, there is a hard limit on the amount of positive parallax that can be induced in a particular scene or shot. The system and techniques discussed below can be used to overcome this problem provide a modeling system that does not have a traditional hard limit on the amount of positive parallax.

2. Modeling a Stereoscopic System Based on Maximum Outward Ocular Divergence

Figure 3A:
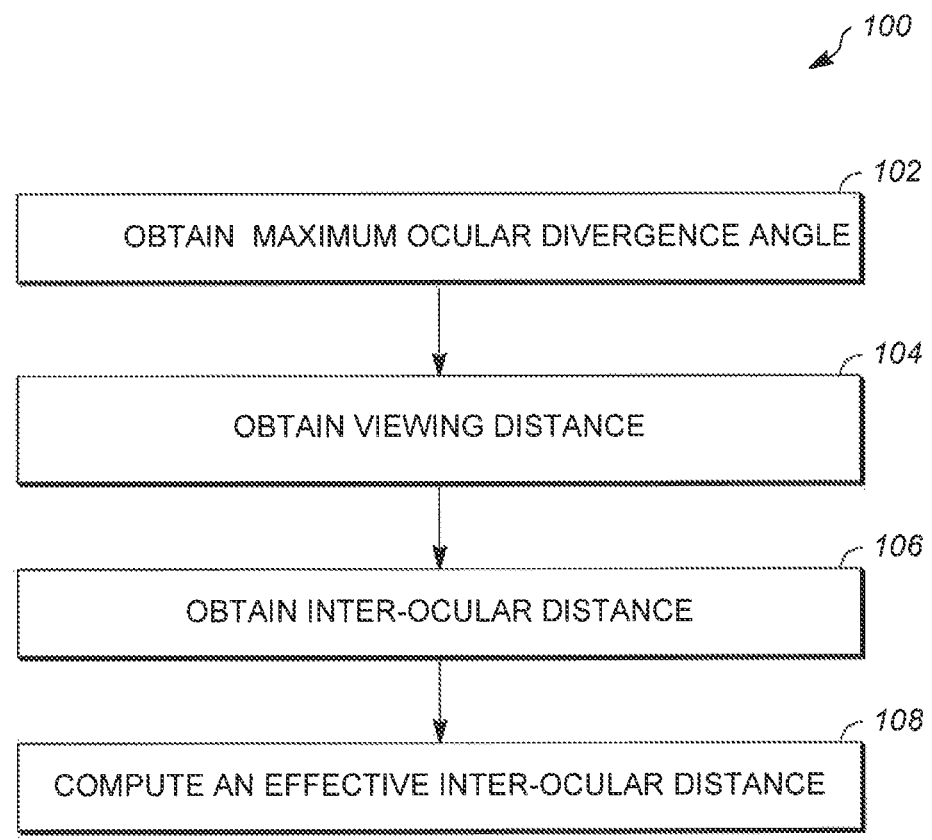
FIG. 3A depicts an exemplary process for computing an effective inter-ocular distance.

FIG. 3A depicts a flow chart of an exemplary process 100 for computing an effective inter-ocular distance for a modeled viewer based on a maximum ocular divergence angle. By computing an effective inter-ocular distance, a stereoscopic image can be created having maximum parallax condition in which parallax exceeds the inter-ocular distance of the modeled viewer.

Additionally, using an effective inter-ocular distance, a stereoscopic modeling system can be adapted to accommodate scenarios where parallax exceeds the inter-ocular distance of the modeled viewer. In general, a stereoscopic modeling system relates a set of parameters in scene space to a set of parameters in viewer space. Exemplary parameters that are used to define a stereoscopic modeling system are depicted in FIGS. 2A-C and discussed above. With respect to exemplary process 100, a stereoscopic modeling system includes, among other things, a modeled viewer that is positioned relative to a modeled viewing screen. These parameters of the stereoscopic modeling system are typically representative of an actual viewer that is seated in a similar position with respect to a projection screen in a theater or viewing room.

In operations 102, 104, and 106, parameters describing the optical configuration of the modeled viewer are obtained. Typically, these parameters are defined with respect to the modeled viewing screen in viewer space and may be specified by the theater or expected viewing environment. The parameters obtained in operations 102, 104, and 106 may be predetermined and stored in computer memory. The parameters may also be obtained from a user as user-defined input.

Figure 4:
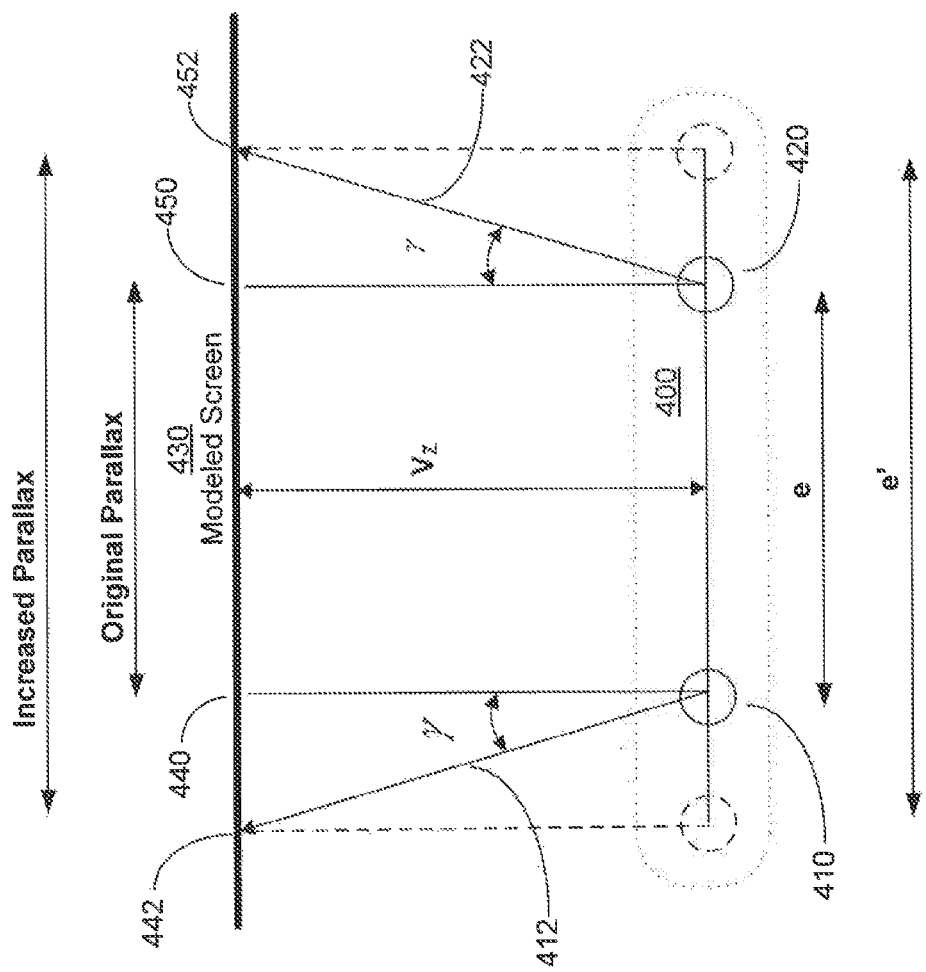
FIG. 4 depicts an exemplary configuration defining parameters related to the effective inter-ocular distance.

In operation 102, a maximum ocular divergence angle is obtained for the modeled viewer. As shown in FIG. 4, a modeled viewer 400 includes a left perspective 410 having a left perspective path 412 and a right perspective 420 having a right perspective path 422. The left and right perspectives (410, 420) may represent the left and right eyes of an actual viewer. Similarly, the left and right perspective paths (412, 422) may represent the central optical paths of an actual viewer's eyes. As shown in FIG. 4, the left and right perspective paths (412, 422) diverge outward from the center of the modeled user 400. The amount of divergence is represented by angle γ. The maximum ocular divergence angle represents the maximum angle between a left or right optical path of the modeled viewer and a plane perpendicular to the modeled screen.

In some cases, the maximum ocular divergence angle is determined based on the amount of comfortable outward divergence that can be tolerated by a typical actual viewer without causing discomfort. The maximum ocular divergence angle may be less than 0.25° for each left and right perspective of the modeled viewer.

In operation 104, a viewing distance from the modeled viewer to a modeled viewing screen in viewer space is obtained. FIG. 4 depicts an exemplary viewing distance $V_z$ between the modeled screen 430 and the modeled viewer 400. As shown in FIG. 4, the viewing distance $V_z$ may be defined as the distance from the midpoint between the left and right perspectives (410, 420) to the modeled screen 430. In other cases, the viewing distance $V_z$ may be defined as the distance from any point associated with the modeled viewer 400 to the modeled screen 430.

In operation 106, an inter-ocular distance between a left perspective position and a right perspective position for the modeled viewer is obtained. FIG. 4 depicts an exemplary inter-ocular distance e between left and right perspectives (410, 420). The inter-ocular distance represents a typical distance between an actual viewer's eyes.

In operation 108, an effective inter-ocular distance is computed based on the maximum ocular divergence angle, viewing distance, and the inter-ocular distance, defined in operations 102, 104, and 106. FIG. 4 depicts an exemplary effective inter-ocular distance e' that can be computed using equation 1 expressed as:

$$e' = e + 2V_z \tan(\gamma), \quad [1]$$

where e is the inter-ocular distance, $V_z$ is the viewing distance, and γ is the maximum ocular divergence angle. Equation 1 depicts one exemplary method of computing effective inter-ocular distance e'. Other techniques can be used to determine the effective inter-ocular distance e' based on a defined maximum ocular divergence angle using similar geometric relationships between the modeled viewer and the modeled screen.

The computed effective inter-ocular distance e' allows for greater parallel-vision parallax as compared to the original inter-ocular distance e. That is, the computed effective inter-ocular distance e' allows for a greater maximum positive parallax that can be accommodated without outward divergence. For example, as shown in FIG. 4, left and right screen locations 440, 450 represent the original maximum parallel vision parallax using the original inter-ocular distance e. Using the original inter-ocular distance e, the maximum positive parallax can be increased to screen locations 442, 452, but only by outwardly diverting the left and right perspective paths (412, 422) by the maximum ocular divergence angle γ. As discussed above, this is impermissible using some stereoscopic modeling systems. As shown in FIG. 4, the computed effective inter-ocular distance e' provides a greater parallel-vision parallax corresponding to screen locations 442 and 452. That is, without outwardly diverging the left and right perspective paths, the effective inter-ocular distance e' can view screen locations 442 and 452.

The effective inter-ocular distance can also be used to compose a computer-generated scene having a computer-generated object in view of a pair of stereoscopic cameras. For example, the effective inter-ocular distance may represent a maximum positive parallax condition that must be satisfied. As shown in FIGS. 2A and 2B, a pair of stereoscopic cameras (pair 202, 204 and pair 212, 214) can be positioned with respect to computer-generated objects in a computer-generated scene. The placement of the objects and/or the stereoscopic cameras within the scene determines the composition of the scene and determines, in part, the parallax between left and right views of the computer-generated object. The effective inter-ocular distance, representing the maximum parallax condition, can be used to verify that the composition of the scene is acceptable with respect to the modeled viewer. A stereoscopic image of the computer-generated object can be created. Using the effective inter-ocular distance as a maximum parallax condition, the image can be created having a parallax between left and right views of the computer-generated object that is greater than the inter-ocular distance of the modeled viewer.

The effective inter-ocular distance can also be used in a stereoscopic modeling system in place of the inter-ocular distance. As mentioned above, a stereoscopic modeling system relates a set of parameters in a camera space to a set of parameters in viewer space. For example, a stereoscopic transformation is a particular type of a stereoscopic modeling system and can be used to transform points on a computer-generated object in camera space to a points on a screen in viewer space, and visa-versa. In one example, a stereoscopic transformation can be computed using the effective inter-ocular distance e' in place of the original inter-ocular distance e. A more detailed description of this is provided below with respect to FIG. 3B and process 120. Process 100 is not limited to use with a stereoscopic transformation and other stereoscopic modeling systems may also be used.

Figure 3B:
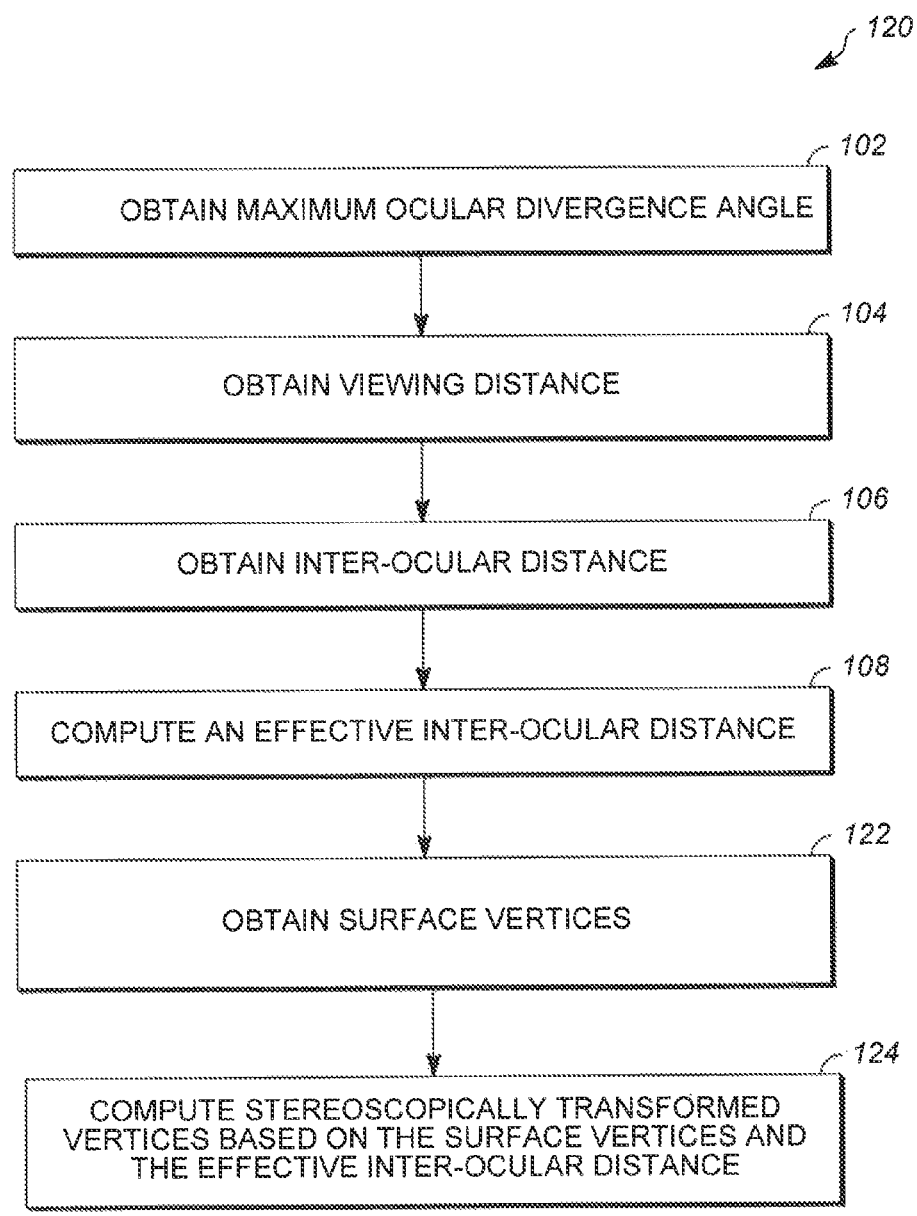
FIG. 3B depicts exemplary processes for computing stereoscopically transformed vertices based on an effective inter-ocular distance.

FIG. 3B depicts a flow chart of an exemplary process 120 for computing one or more stereoscopically transformed vertices based on a maximum outward ocular divergence angle for a modeled viewer. Specifically, process 120 describes how a stereoscopic transformation can be computed using an effective inter-ocular divergence distance to adapt the transformation to accommodate scenarios where positive parallax exceeds the inter-ocular distance of the modeled viewer.

In operations 102, 104, and 106, parameters describing the optical configuration of the modeled viewer are obtained. As described above with respect to process 100, these parameters are defined with respect to the modeled viewing screen in viewer space and may be specified by the theater or expected viewing environment. The parameters obtained in operations 102, 104, and 106 may be predetermined and stored in computer memory. The parameters may also be obtained from a user as user-defined input. Operations 102, 104, and 106 are the same for process 100.

In operation 108, an effective inter-ocular distance is computed based on the maximum ocular divergence angle, viewing distance, and the inter-ocular distance, defined in operations 102, 104, and 106, above. The effective inter-ocular distance e' can be computed in accordance with Equation 1, as described above with respect to process 100.

In operations 122 and 124 an effective inter-ocular distance e' is used in conjunction with a stereoscopic modeling system, specifically, a stereoscopic transformation. In general, a stereoscopic transformation can be used to transform surface geometry in camera space to transformed geometry in viewer space. The transformed geometry represents how a viewer may perceive surface geometry when stereoscopically filmed and may indicate unwanted distortion in the stereoscopically filmed scene.

In operation 122, one or more surface vertices are obtained for a computer-generated object in camera space. Operation 112 can be performed on a computer-generated object on an object-by-object basis in a computer-generated scene. For purposes of this discussion, a computer-generated object is the surface model of the animated character 500 depicted in FIG. 5 (Puss in Boots). One of skill in the art would understand that this technique could also be applied to a portion of a computer-generated object as well as a composite of multiple computer-generated objects.

Figure 5:
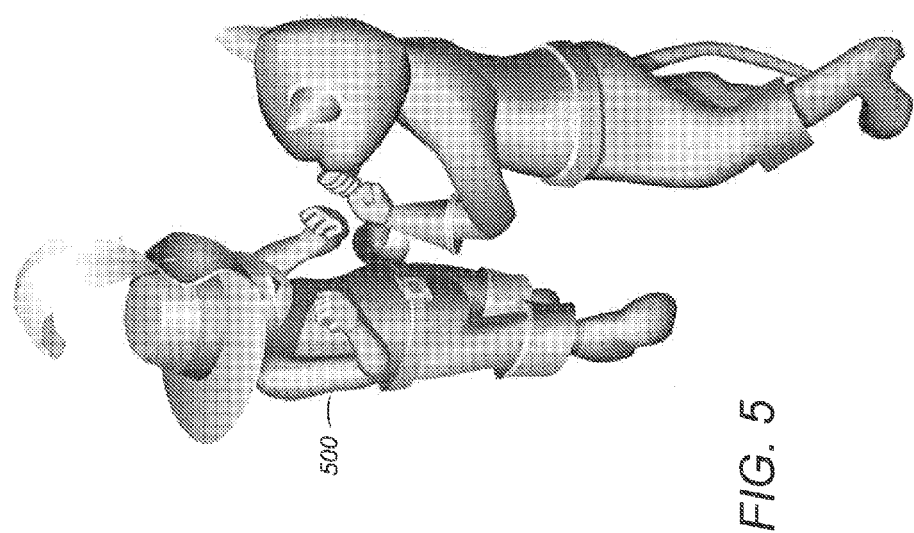
FIG. 5 depicts an animated character in a computer-generated scene.

In this example, the one or more surface vertices is a subset of the vertices used to define the outside surface of the animated character 500 depicted in FIG. 5. In other cases, the one or more surface vertices may be derived from the surface geometry of the computer-generated object, but not necessarily used to define the outside surface of the computer generated object.

In operation 124, one or more stereoscopically transformed vertices are computed based on the one or more surface vertices and the effective inter-ocular distance. The one or more stereoscopically transformed vertices may be computed using exemplary Equations 2-4, below:

$$P_x = \frac{\left(fe'\frac{W_s}{W_c}\right)\left(\tan\left[\arctan\left(\frac{t+2C_x}{2C_z}\right)-\beta\right]-\tan\left[\arctan\left(\frac{t-2C_x}{2C_z}\right)-\beta\right]\right)}{2e'-4h\left(\frac{W_s}{W_c}\right)+2f\left(\frac{W_s}{W_c}\right)\left(\tan\left[\arctan\left(\frac{t-2C_x}{2C_z}\right)-\beta\right]-\tan\left[\arctan\left(\frac{t+2C_x}{2C_z}\right)-\beta\right]\right)}, \quad [2]$$

$$P_y = \frac{e'(Y_{sl}+Y_{sr})}{e'-2h\left(\frac{W_s}{W_c}\right)+f\left(\frac{W_s}{W_c}\right)\left(\tan\left[\arctan\left(\frac{t-2C_x}{2C_z}\right)-\beta\right]-\tan\left[\arctan\left(\frac{t+2C_x}{2C_z}\right)-\beta\right]\right)}, \quad [3]$$

$$P_z = \frac{e'V_z}{e'-2h\left(\frac{W_s}{W_c}\right)+f\left(\frac{W_s}{W_c}\right)\left(\tan\left[\arctan\left(\frac{t-2C_x}{2C_z}\right)-\beta\right]-\tan\left[\arctan\left(\frac{t+2C_x}{2C_z}\right)-\beta\right]\right)}, \quad [4]$$

where: $(P_x, P_y, P_z)$ is a transformed vertex of the one or more transformed vertices, $(C_x, C_y, C_z)$ is a surface vertex of the one or more surface vertices of the computer-generated object in camera space, $Y_{sl}$ is the y-coordinate of the point on the screen for the left camera, $Y_{sr}$ is the y-coordinate of the point on the screen for the left camera, $W_c$ is the horizontal width of the camera imaging sensor, $W_s$ is the horizontal width of the display screen, f is the focal length (FIGS. 2A and B), t is the horizontal distance between the optical centers of the left and right cameras, c is the convergence distance, $V_z$ is the viewing distance from the viewer to the screen, β is the convergence angle (FIG. 2A), and h is the camera sensor offset (FIG. 2B). Equations 2-4, above, represent an exemplary stereoscopic transformation that can be performed for operation 124. Other transformation equations may be used, depending on which parameters are used to define the filming and viewing scenarios shown in FIGS. 2A-C.

As shown above, Equations 2-4 can be used to transform a surface vertex $(C_x, C_y, C_z)$ into a transformed vertex $(P_x, P_y, P_s)$. For operation 124, it may be necessary to repeat the calculation for each vertex of the one or more surface vertices $(C_v)$ to obtain a corresponding one or more transformed vertices $(P_v)$.

As mentioned above, the set of transformed vertices $(P_v)$ are representative of a stereoscopic shape distortion of the computer-generated object. That is, the set of transformed vertices $(P_v)$ define a transformed geometry having a shape that represents the shape of the computer-generated object, as perceived by a viewer of a stereoscopically filmed and stereoscopically displayed computer-generated scene.

Figure 6B:
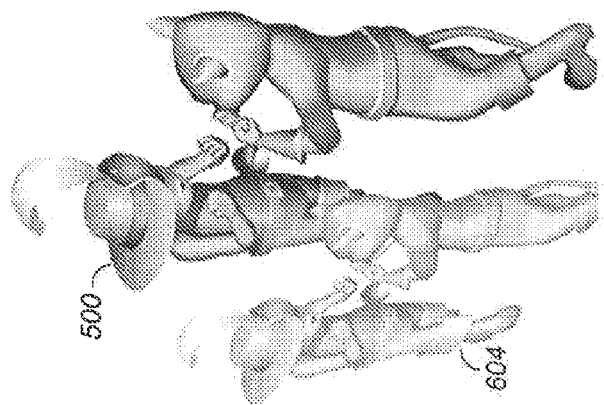
FIGS. 6A-6B depict exemplary transformed geometry with respect to the animated character.
Figure 6A:
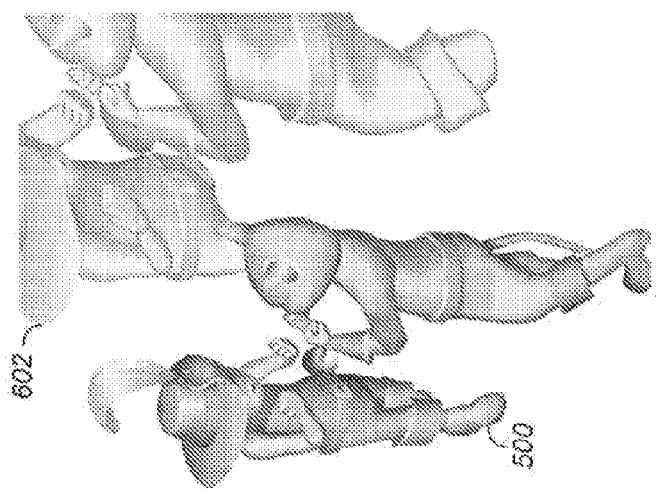

The exemplary process 120 may also be repeated for multiple computer-generated objects in the scene, resulting in one or more stereoscopically transformed vertices for each computer-generated object. Transformed geometry or surface models can be created based on the stereoscopically transformed vertices. FIGS. 6A-B depict exemplary transformed geometry representing the perceived distortions of the animated character 500 in a stereoscopically filmed scene. Each of FIGS. 6A-B depict transformed geometry for different filming and/or viewing conditions.

FIG. 6A depicts both the animated character 500 and transformed geometry 602 that represents the stereoscopic shape distortion of the animated character 500, as perceived by the viewer. As shown in FIG. 6A, the transformed geometry 602 appears elongated in shape and deeper in the scene than the animated character 500. This effect may be due, in part, to a distance between the viewer and the screen that is too large. FIG. 6B depicts the animated character 500 and another example of transformed geometry 604 that represents the stereoscopic shape distortion, as perceived by the viewer. As shown in FIG. 6B, the transformed geometry 604 appears flattened in shape and pushed forward in the scene toward the viewer. This effect may be due to a distance between the viewer and the screen that is too short.

A stereoscopic image of computer-generated object and/or the transformed geometry within the compute-generated scene can be created. In some cases both the computer-generated object and transformed geometry are included in the image allowing a filmmaker to evaluate the degree of distortion of a computer-generated object, from the perspective of the modeled viewer. As discussed earlier, by using the effective inter-ocular distance e', scenarios can be evaluated where the positive parallax exceeds the modeled viewer's original inter-ocular distance e'.

3. Implementation on a Computer Hardware Platform

Figure 7:
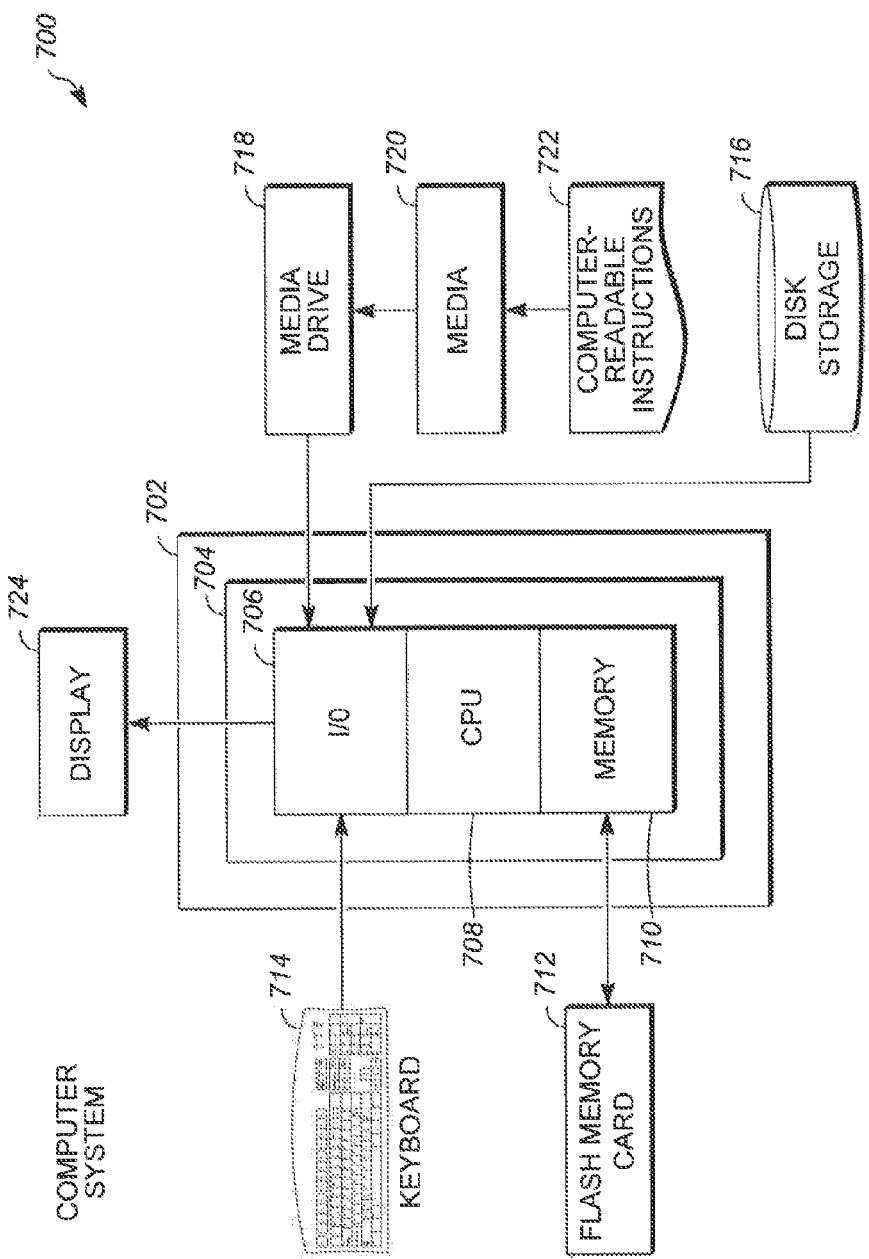
FIG. 7 depicts an exemplary computer system.

The embodiments described herein are typically implemented in the form of computer software (computer executable instructions) executed on a computer. FIG. 7 depicts an exemplary computer system 700 configured to perform any one of the above-described processes. In this context, computer system 700 may be a general-purpose computer including, for example, a processor, memory, storage, and input/output devices (e.g., monitor, keyboard, disk drive, Internet connection, etc.). However, computer system 700 may include circuitry or other specialized hardware for carrying out some or all aspects of the processes. In some operational settings, computer system 700 may be configured as a system that includes one or more units, each of which is configured to carry out some aspects of the processes either in software, in hardware or in some combination thereof. For example, in some embodiments, the process for computing an effective inter-ocular distance or computing stereoscopically transformed geometry, as described in FIGS. 3A and 3B may be computed on parallel computer processors or performed on separate computer systems.

FIG. 7 depicts computer system 700 with a number of standard components that may be used to perform the above-described processes. The main system 702 includes a motherboard 704 having an input/output ("I/O") section 706, one or more central processing units ("CPU") 708, and a memory section 710, which may have a flash memory card 712 related to it. The I/O section 706 is connected to a display 724, a keyboard 714, a disk storage unit 716 and a media drive unit 718. The media drive unit 718 can read a computer-readable medium 720, which typically contains computer-readable instructions 722 and data.

At least some values based on the results of the above-described processes can be saved for subsequent use. For example, the outputs of the system, including the effective inter-ocular distance or transformed geometry, can be saved directly in memory 710 (e.g, RAM (Random Access Memory)) or other form of disk storage 716. Additionally, values derived from the stereo quality metric, such as suggested scene parameters, can also be saved directly in memory.

The above-described processes may be used to compute an effective inter-ocular distance or compute stereoscopically transformed geometry for a three-dimensional computer-generated scene. By computing the effective inter-ocular distance a stereoscopic modeling system can be used to relate relates a set of parameters in a camera space to a set of parameters in viewer space. This relationship may be visualized as displayed parameter values or a representative digital image. The parameter values or digital image may be stored in memory 710, disk storage 716 or viewed on a computer display 724.

Additionally, a non-transitory computer-readable medium can be used to store (e.g., tangibly embody) one or more computer programs for performing any one of the above-described processes by means of a computer. The computer program may be written, for example, in a general-purpose programming language (e.g., Pascal, C, C++) or some specialized application-specific language.

Although the invention has been described in considerable detail with reference to certain embodiments thereof, other embodiments are possible as will be understood to those skilled in the art.

What is claimed is:

1. A computer-implemented method for computing an effective inter-ocular distance for a modeled viewer based on a maximum ocular divergence angle, the method comprising:
    obtaining the maximum ocular divergence angle for the modeled viewer, wherein the maximum ocular divergence angle is based on a maximum angle between a left or right optical path of the modeled viewer diverging outward from center and a plane perpendicular to a modeled viewing screen;
    obtaining a viewing distance from the modeled viewer to the modeled viewing screen;
    obtaining an inter-ocular distance between a left perspective position and a right perspective position for the modeled viewer;
    computing the effective inter-ocular distance based on the viewing distance, the inter-ocular distance, and the maximum ocular divergence angle, the effective inter-ocular distance representing a maximum parallax condition;
    composing a computer-generated scene having a computer-generated object in view of a pair of stereoscopic cameras based on the effective inter-ocular distance; and
    creating a stereoscopic image of the computer-generated object within the computer generated scene.

2. The computer-implemented method of claim 1, wherein the stereoscopic image has a positive parallax between left and right views of the computer-generated object that is greater than the inter-ocular distance of the modeled viewer.

3. The computer-implemented method of claim 1, further comprising:
    using the effective inter-ocular distance in a stereoscopic modeling system in place of the inter-ocular distance, the stereoscopic modeling system relating a set of parameters in a camera space to a set of parameters in viewer space.

4. The computer-implemented method of claim 1, wherein computing the effective inter-ocular distance includes adding the inter-ocular distance to twice the viewing distance times a tangent of the maximum outward ocular divergence angle.

5. The computer-implemented method of claim 1, wherein the inter-ocular distance represents a typical distance between an actual viewer's left and right eye.

6. The computer-implemented method of claim 1, wherein the maximum ocular divergence angle is less than 0.25 degree.

7. A non-transitory computer-readable medium including computer-readable instructions that when executed on a computer processor cause the computer processor to compute an effective inter-ocular distance for a modeled viewer based on a maximum ocular divergence angle, the instructions for:
  obtaining the maximum ocular divergence angle for the modeled viewer, wherein the maximum ocular divergence angle is based on a maximum angle between a left or right optical path of the modeled viewer diverging outward from center and a plane perpendicular to a modeled viewing screen;
  obtaining a viewing distance from the modeled viewer to the modeled viewing screen;
  obtaining an inter-ocular distance between a left perspective position and a right perspective position for the modeled viewer;
  computing the effective inter-ocular distance based on the viewing distance, the inter-ocular distance, and the maximum ocular divergence angle, the effective inter-ocular distance representing a maximum parallax condition;
  composing a computer-generated scene having a computer-generated object in view of a pair of stereoscopic cameras based on the effective inter-ocular distance; and
  creating a stereoscopic image of the computer-generated object within the computer generated scene.

8. The non-transitory computer-readable medium of claim 7,
  wherein the stereoscopic image has a positive parallax between left and right views of the computer-generated object that is greater than the inter-ocular distance of the modeled viewer.

9. The non-transitory computer-readable medium of claim 7, further comprising:
  using the effective inter-ocular distance in a stereoscopic modeling system in place of the inter-ocular distance, the stereoscopic modeling system relating a set of parameters in a camera space to a set of parameters in viewer space.

10. The non-transitory computer-readable medium of claim 7, wherein computing the effective inter-ocular distance includes adding the inter-ocular distance to twice the viewing distance times a tangent of the maximum ocular divergence angle.

11. A computer system for computing an effective inter-ocular distance for a modeled viewer based on a maximum ocular divergence angle, the system comprising:
  a memory for storing non-transitory computer-readable instructions;
  a processor for executing the computer-readable instructions, the instructions for:
    obtaining the maximum ocular divergence angle for the modeled viewer, wherein the maximum ocular divergence angle is based on a maximum angle between a left or right optical path of the modeled viewer diverging outward from center and a plane perpendicular to a modeled viewing screen;
    obtaining a viewing distance from the modeled viewer to the modeled viewing screen;
    obtaining an inter-ocular distance between a left perspective position and a right perspective position for the modeled viewer; and
    computing the effective inter-ocular distance based on the viewing distance, the inter-ocular distance, and the maximum ocular divergence angle, the effective inter-ocular distance representing a maximum parallax condition;
    composing a computer-generated scene having a computer-generated object in view of a pair of stereoscopic cameras based on the effective inter-ocular distance; and
    creating a stereoscopic image of the computer-generated object within the computer generated scene.

12. The system of claim 11,
  wherein the stereoscopic image has a positive parallax between left and right views of the computer-generated object that is greater than the inter-ocular distance of the modeled viewer.

13. A computer-implemented method for computing one or more stereoscopically transformed vertices based on a maximum ocular divergence angle for a modeled viewer, the method comprising:
  obtaining the maximum ocular divergence angle for the modeled viewer, wherein the maximum ocular divergence angle is based on a maximum angle between a left or right optical path of the modeled viewer diverging outward from center and a plane perpendicular to a modeled viewing screen;
  obtaining a viewing distance from the modeled viewer to the modeled viewing screen;
  obtaining an inter-ocular distance between a left perspective position and a right perspective position of the modeled viewer;
  computing an effective inter-ocular distance based on the viewing distance, the inter-ocular distance, and the maximum ocular divergence angle;
  obtaining one or more surface vertices for a computer-generated object in a stereoscopically filmed, computer-generated scene; and
  computing the one or more stereoscopically transformed vertices based on the one or more surface vertices and the effective inter-ocular distance.

14. The computer-implemented method of claim 13, further comprising creating transformed geometry based on the stereoscopically transformed vertices, the transformed geometry being representative of a stereoscopic shape distortion of the computer-generated object.

15. The computer-implemented method of claim 14, further comprising creating a stereoscopic image of the computer-generated object within the computer-generated scene.

16. The computer-implemented method of claim 13, wherein computing the effective inter-ocular distance includes adding the inter-ocular distance to twice the viewing distance times a tangent of the maximum ocular divergence angle.

17. The computer-implemented method of claim 13, wherein the effective inter-ocular distance represents a maximum positive parallax for the modeled viewer having said inter-ocular distance and maximum ocular divergence angle.

18. The computer-implemented method of claim 13, wherein the inter-ocular distance represents a typical distance between an actual viewer's left and right eye.

19. The computer-implemented method of claim 13, wherein the maximum ocular divergence angle is less than 0.25 degree.

20. The computer-implemented method of claim 13, wherein the one or more surface vertices includes vertices that are visible from at least one camera of a pair of cameras used for creating a stereoscopic view of the computer-generated scene.

21. The computer-implemented method of claim 20, wherein computing the one or more transformed vertices includes computing a stereoscopic transformation of the one or more surface vertices based on the effective inter-ocular distance.

22. The computer-implemented method of claim 21, wherein the stereoscopic transformation is based on, in part, a convergence distance, wherein the convergence distance is a distance from the pair of cameras to a point in the computer-generated scene that results in zero parallax.

23. The computer-implemented method of claim 21, wherein the stereoscopic transformation is based on, in part, a location, within the computer-generated scene, of the pair of cameras used to create the stereoscopic view of the computer-generate object.

24. The computer-implemented method of claim 23, wherein the location of the pair of cameras is defined by one or more of the following:
   a location of an optical center of the at least one camera of the pair of cameras;
   an offset of an optical sensor with respect to the optical center of the at least one camera of the pair of cameras; and
   a convergence angle between the pair of cameras.

25. A non-transitory computer-readable medium including computer-readable instructions that when executed on a computer processor cause the computer processor to compute one or more stereoscopically transformed vertices based on a maximum ocular divergence angle for a modeled viewer, the instructions for:
   obtaining the maximum ocular divergence angle for the modeled viewer, wherein the maximum ocular divergence angle is based on a maximum angle between a left or right optical path of the modeled viewer diverging outward from center and a plane perpendicular to a modeled viewing screen;
   obtaining a viewing distance from the modeled viewer to the modeled viewing screen;
   obtaining an inter-ocular distance between a left perspective position and a right perspective position of the modeled viewer;
   computing an effective inter-ocular distance based on the viewing distance, the inter-ocular distance, and the maximum ocular divergence angle;
   obtaining one or more surface vertices for a computer-generated object in a stereoscopically filmed, computer-generated scene; and
   computing the one or more stereoscopically transformed vertices based on the one or more surface vertices and the effective inter-ocular distance.

26. The non-transitory computer-readable medium of claim 25, further comprising creating transformed geometry based on the stereoscopically transformed vertices, the transformed geometry being representative of a stereoscopic shape distortion of the computer-generated object.

27. The non-transitory computer-readable medium of claim 26, further comprising creating a stereoscopic image of the computer-generated object within the computer-generated scene.

28. The non-transitory computer-readable medium of claim 25, wherein computing the effective inter-ocular distance includes adding the inter-ocular distance to twice the viewing distance times a tangent of the maximum ocular divergence angle.

29. The non-transitory computer-readable medium of claim 25, wherein the effective inter-ocular distance represents a maximum positive parallax for the modeled viewer having the defined inter-ocular distance and maximum ocular divergence angle.

30. The non-transitory computer-readable medium of claim 25, wherein the one or more surface vertices includes vertices that are visible from at least one camera of a pair of cameras used for creating a stereoscopic view of the computer-generated scene.

31. The non-transitory computer-readable medium of claim 25, wherein computing the one or more transformed vertices includes computing a stereoscopic transformation of the one or more surface vertices based on the effective inter-ocular distance.

32. A computer system for computing one or more stereoscopically transformed vertices based on a maximum ocular divergence angle for a modeled viewer, the system comprising:
   a memory for storing non-transitory computer-readable instructions;
   a processor for executing the computer-readable instructions, the instructions for:
   obtaining the maximum ocular divergence angle for the modeled viewer, wherein the maximum ocular divergence angle is based on a maximum angle between a left or right optical path of the modeled viewer diverging outward from center and a plane perpendicular to a modeled viewing screen;
   obtaining a viewing distance from the modeled viewer to the modeled viewing screen;
   obtaining an inter-ocular distance between a left perspective position and a right perspective position of the modeled viewer;
   computing an effective inter-ocular distance based on the viewing distance, the inter-ocular distance, and the maximum ocular divergence angle;
   obtaining one or more surface vertices for a computer-generated object in a stereoscopically filmed, computer-generated scene; and
   computing the one or more stereoscopically transformed vertices based on the one or more surface vertices and the effective inter-ocular distance.

* * * * *